United States Patent
Schlüter et al.

[11] Patent Number: 5,873,247
[45] Date of Patent: Feb. 23, 1999

[54] VEHICLE BRAKE SYSTEM WITH AN ELECTRONICALLY CONTROLLABLE BRAKE BOOSTER

[75] Inventors: Peter Schlüter, Kammerforst; Stefan Bubenheim; Christoph Beuerle, both of Koblenz; Ulrich Danne, Benddorf-Sayn, all of Germany

[73] Assignee: Lucas Industries public limited company, West Midlands, Great Britain

[21] Appl. No.: 813,468

[22] Filed: Mar. 10, 1997

Related U.S. Application Data

[63] Continuation-in-part of PCT/EP95/03338 Aug. 22, 1995 published as WO96/08399.

[30] Foreign Application Priority Data

Sep. 13, 1994 [DE] Germany ........................ 44 32 583.5

[51] Int. Cl.⁶ .................. F15B 7/00; F15B 9/10
[52] U.S. Cl. .............. 60/534; 60/545; 91/369.4
[58] Field of Search ................ 60/534, 545; 303/113.3, 303/114.3, 125; 188/356, 357; 200/83 Q, 83 J; 91/369.4

[56] References Cited

U.S. PATENT DOCUMENTS

| | | | |
|---|---|---|---|
| 5,556,173 | 9/1996 | Steiner et al. | 303/113.4 X |
| 5,658,055 | 8/1997 | Dieringer et al. | 303/114.3 |
| 5,720,532 | 2/1998 | Steiner et al. | 303/125 |
| 5,772,290 | 6/1998 | Heibel et al. | 303/113.4 |

FOREIGN PATENT DOCUMENTS

| | | |
|---|---|---|
| 03 27 276 A3 | 8/1989 | European Pat. Off. . |
| 03 79 329 A3 | 7/1990 | European Pat. Off. . |
| 39 02 215 A1 | 8/1990 | Germany . |
| 92 02 154 U | 4/1992 | Germany . |
| 42 17 409 A1 | 12/1993 | Germany . |
| 43 09 850 A1 | 9/1994 | Germany . |
| 43 38 070 C1 | 2/1995 | Germany . |
| 44 00 688 A1 | 2/1995 | Germany . |
| WO 93/21048 | 10/1993 | WIPO . |
| WO 94/11226 | 5/1994 | WIPO . |

*Primary Examiner*—John E. Ryznic
*Attorney, Agent, or Firm*—Wood, Herron & Evans, L.L.P.

[57] ABSTRACT

A vehicle brake system with an electronically controllable brake booster, comprising an actuation member (70, 80) transferring the actuation travel of a brake pedal to a master cylinder, which is allocated a travel limiting element (82) accepted between two abutment faces which limits the actuation travel of the actuation member (70), and a switching element (85) which upon an actuation movement of the actuation member (70) can be activated by one of the abutments (91, 91a) in order to issue a signal to the controller of the brake booster, with the travel limiting element being arranged on the actuation member (80) between two collars (83, 84), and a carrier (86) accepting the switching element (85) being arranged between the travel limiting element and one of the collars.

23 Claims, 3 Drawing Sheets

VEHICLE BRAKE SYSTEM WITH AN ELECTRONICALLY CONTROLLABLE BRAKE BOOSTER

This application is a continuation of PCT/EP95/03338, filed on Aug. 22, 1995 published as WO96/08399.

The present invention relates to a vehicle brake system with an electronically controllable brake booster.

For vehicle brake systems with brake boosters there is the requirement to complete a braking operation initiated by the driver in an optimum manner, even then when the driver's reaction is not always appropriate to the prevailing situation. For this purpose, electromagnetically operable auxiliary air controllers were provided which were activated dependent on the actuation dynamics of the brake pedal (see applicant's postpublished applicatons P 42 17 409 and P 43 09 850).

From DE-OS 39 02 215 a vacuum brake booster is known where a contact switch is provided in the range of the stroke of a valve piston in the control valve housing. The first contact of this contact switch is formed as a metallic ring which engages a recess in the control valve housing. The second contact is formed by the valve piston itself, with an axially movable metallic contact member being guided in a guide sleeve arranged in the ring and made from an insulating material, which is biassed by means of a compression spring and provides for an electric connection between the ring and the valve piston. A valve is connected with two contact elements embedded in the control valve housing, with the contact element cooperating with the valve piston being biassed by means of a compression spring against the valve piston. The compression spring is thereby constantly subjected to tension so that the connection between the working chamber of the brake booster and the vacuum source is free. In the case of an actuation the valve member is lifted off the ring so that the current supply to the valve and consequently the connection between the working chamber and the vacuum source are interrupted.

From EP 0 327 276 a brake booster is known where a switching means is arranged adjacent to the valve element for activating brake lights and a stop element is carried by the valve element, with the switching means being activated dependent on a movement of the stop element together with the valve element. The assembly including the switching element is attached to a housing of the brake booster which contains the servo cylinder.

From EP 0 379 329 a brake booster is known where a switch with two contacts is arranged in the housing of the brake booster. An actuation member axially displaced by the brake pedal has a laterally projecting bar which can bridge the two contacts and thus close the circuit.

From postpublished P 44 00 688.8 a vehicle brake system with an electronically controllable brake booster is known, which comprises an actuation member transmitting the actuation travel of the brake pedal to a master cylinder, which is allocated a travel limiting element, limiting the axial actuation travel of the actuation member, in that it is accepted between two stops.

In order to positively and trouble freely detect an abortion of an emergency braking desired by the driver, with this arrangement a switching elemente can be activated by the travel limiting element together with one of the stops, which upon contact between the travel limiting element and said stop issues a signal to the controller of the brake booster.

It is thereby achieved that by the driver's release the brake pedal only the switching element is activated in such a manner that it initiates a signal which is supplied to the electronic controller of the vehicle brake system in order to cancel the maximum level control of the brake power (as it is taught in the above state of the art).

This arrangement is, however, expensive in that a precisely defined switching point is difficult to establish due to the tolerances and assembly inaccuracies.

The present invention is therefore based on the problem to provide an easy to assemble and space saving arrangement that has the capability to compensate the tolerances so that the switching point can be reliably established.

To solve this problem the initially mentioned apparatus is characterized by the characteristics of claim 1.

This arrangement of the switching elements permits the positive detection of a driver's intention so that for example a deactivation of the brake power assistance during the transition from an emergency braking to a directed braking. "Emergency braking" means a braking operation with the shortest stopping distance, whereas "directed braking" refers to a braking operation before reaching a certain obstacle.

Further properties and advantages of the invention will be explained in the following description of embodiments with reference to the accompanying drawings in which:

FIG. 1 shows an overall view of a pneumatic brake booster of a vehicle brake system, which is equipped with a switching element according to the invention.

Figure 1:
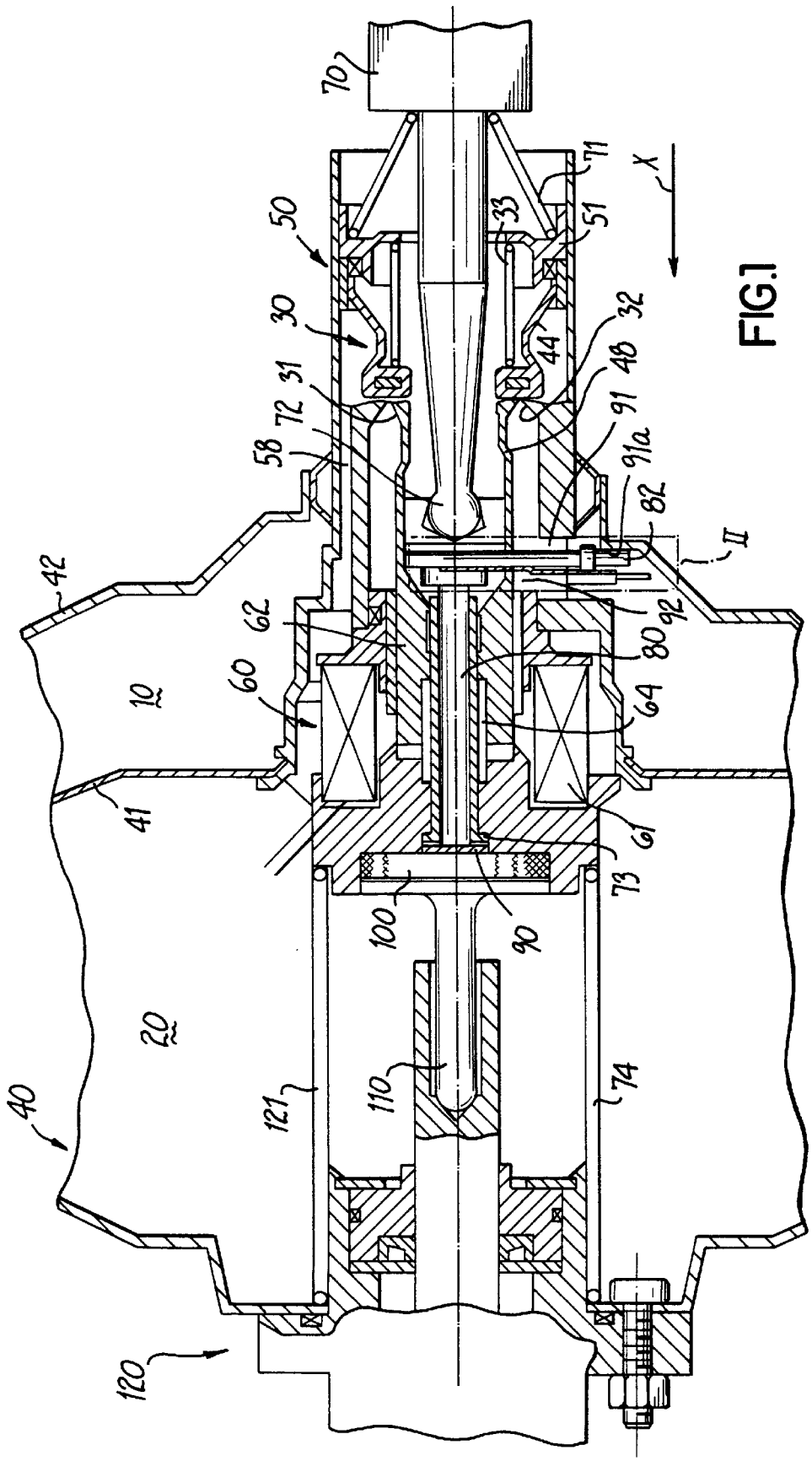
FIG. 1 shows a brake booster in a schematic sectional view.

A brake booster 40 as illustrated has an essentially rotation symmetrical housing 42, in which a rear chamber 10 and a front chamber 20 are arranged and separated by a movable wall 41. The brake booster includes a first controllable valve 30 which is connected with the movable wall 41 for a common relative movement with respect to the housing 42. The valve 30 is acted upon by a front end 72 of a bar shaped actuation member 70 which in the installed position is connected with a brake pedal (not shown) of the motor vehicle.

Within the brake booster a force output element 110 is arranged which indirectly bears against a valve housing 50.

The force output member 110 is provided for the activation of a (schematically indicated) master cylinder 120.

In the parked condition with the vacuum source switched off, the atmospheric pressure is prevailing in both chambers 10 and 20. With the vacuum source switched on, e.g. with the motor running, with the suction pipe of which the front chamber 20 is connected, a vacuum is generated in the front chamber 20 so that the movable wall 41 and with it the valve 30 are slightly displaced forwardly so that a new pressure balance sets in between both chambers 10 and 20. Out of this readiness position a lost travel free activation of the brake booster is ensured.

Upon a normal actuation of the brake pedal by the driver the brake booster operates in the usual way in that the connection between both chambers 10 and 20 is interrupted by means of the controllable valve 30 and ambient air flows into the rear chamber 10. Consequently, an activation force amplified by the brake booster is now available at the force output member 110.

The actuation member 70 projects into the control housing 50 which is securely connected with the movable wall 41 and axially movable in the housing 42. The control housing 50 carries at its rear end a valve closing element 44 which can come into engagement with an inner valve seat 31 at a valve piston 48 and with an outer valve seat 32 which is formed at the inner surface of the control housing 50. A valve piston 80 is positively coupled with the free end 72 of the actuation member 70. The valve closing member 44 is forced against the outer valve seat 32 by means of a compression spring 33 bearing against an outer annular cage 51. The rear chamber 10 is thus sealed against the front chamber 20 because a passage 58 is blocked.

A foreward movement in the direction of an arrow X of the actuation member 70 is transmitted via the valve piston 80, a sensor disk 90, and a rubber elastic part 100 accepted in a recess in the face of the valve housing 50 to the force output element 110, which transfers the movement to an actuating piston 121 of the master cylinder 120 (indicated schematically) of the brake system which is attached to the vacuum end of the brake booster.

A second compression spring 71 arranged between the actuation member 70 and the cage 51 causes the actuation member 70 to be biassed relative to the control housing 50.

The sensor disk is so arranged between the valve piston 80 and the rubber elastic, disk shaped part 100 that its axial movability is limited to one side by the rubber elastic part 100 and to the other side by a ring collar 73 acting as a back stop through which the valve piston 80 is projecting and acting upon the sensor disk 90.

The axial movability of the valve piston 80 and thus also that of the actuation member 70 connected to it is limited by a travel limiting element 82 which is positively fitted in an annular groove with two collars 83, 84 in the valve piston 80. The travel limiting element 82 has the form of an essentially U shaped clamp the legs of which are bent toward each other in their central area so as to securely enclose the valve piston 80. The travel limiting element 82 projects into a duct K which leads to the rear chamber 10. Between the two legs 89a, 89b of the travel limiting element 82 a switching element 85 is arranged at a carrier 86. The walls of the duct K are formed as abutment faces 91, 92 between which the travel limiting element 82 can be reciprocated in an axial direction.

The distance between the ring collar 73 acting as a back stop and the sensor disk 90, at which under cooperation of the travel limiting element 82 the switch 85 can be activated is so dimensioned that upon contact between the sensor disk 90 and the ring collar 73 the travel limiting element 82 or the associated switching element 85, respectively, is still a distance away from the abutment face 91. This ensures that for the activation of the switching element 85 the travel limiting element 83 has still to cover the distance in the direction of the abutment face 91.

This distance is so dimensioned that an erroneous activation of the switching element 85 due to a reset of the actuation member 110 or the sensor disk 90, respectively, which might occur for example during the ABS operation is precluded by hydraulic forces.

Figure 2:
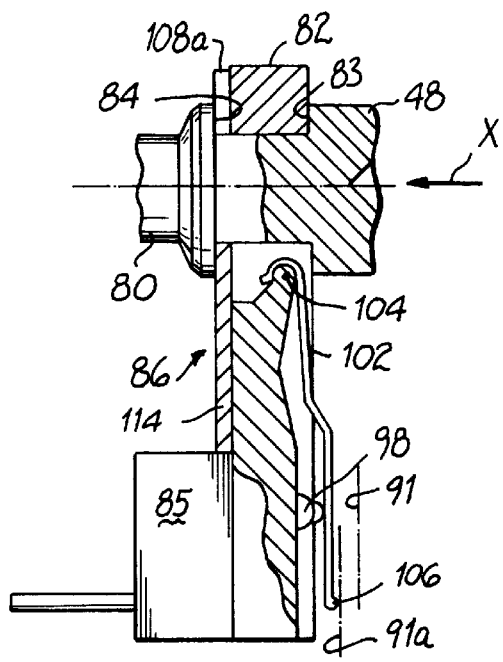
FIG. 2 shows an enlarged schematic view of a portion identified by II of the valve in FIG. 1.

FIG. 2 is an enlarged illustration of the portion identified by II in FIG. 1. At the carrier 86 the switching element 85 is attached, e.g. by bonding, in such a manner that a control knob 98 of the switching element 85 projects beyond the two legs 89a, 89b in the direction of the abutment 91. The switching element 85 comprises a pivotable control lever 102 which consists of a sheet metal form part being pivotably supported at its one end on a pivot 104 and having at its other end a bead 106 which in the inactive position rests against a wall 91a of the housing 42 of the brake booster.

Figure 3:
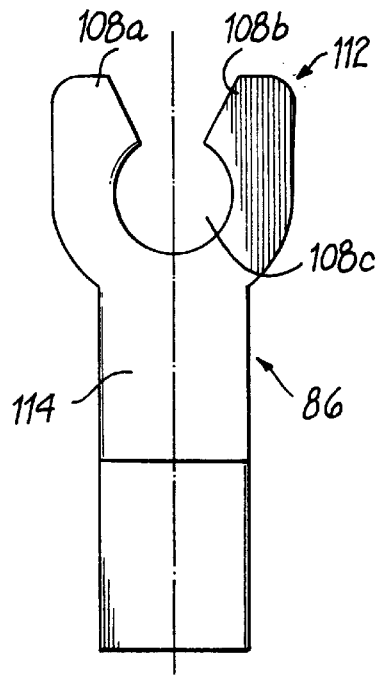
FIG. 3 shows a carrier according to the invention in a first embodiment as a schematic plan view.

The carrier 86 shown as a plan view in FIG. 3 comprises two claws 108a, 108b defining a circular area 108c in between, the diameter of which corresponds to the diameter of the groove bottom of the annular groove between the two collars 83, 84. The circular area 108c expands funnel shaped toward a free end 112 of the carrier 86 so that the carrier 86 can be pushed into the annular groove and be interlocked with the groove bottom. A carrier arm 114 of the carrier 86 is integrally formed to the claws 108a, 108b and serves as a support for the switching element 85. The face of the carrier arm 114 contacts the travel limiting element 82 or its legs 89a, 89b, respectively (see FIG. 2). The claws 108a, 108b and the carrier arm 114 are formed from a sheet type elastic material—preferably spring steel—and are curved in the drawing plane shown in FIG. 3 so that the carrier 86 together with the travel limiting element 82 is accepted clearance free in the annular groove between the two collars 83, 84. This means that the annular groove is completely filled by the travel limiting element 82 and the claws 108a, 108b without any clearance remaining between the collar 84, the carrier 86, the travel limiting element 82 and the collar 83.

Due to the fact that the travel limiting element 82 together with the carrier 86 is accepted in the annular groove between the collars 83, 84 and both together can be displaced in the direction of the arrow X or in the opposite direction, the switching element 85 can positively detect the end position of the travel limiting element 82 at the abutment 91 and issue a corresponding signal. The separation into two independent components—the travel limiting element 82 and the carrier 86—ensures that the switching element 85 cannot be damaged when in contact with the abutment 91, because the resilience of the carrier 86 or its carrier arm 114, respectively, permits the switching element 85 to yield to the rear. It is understood that the activation force of the control knob 98 is smaller than the force required for the deformation of the carrier 86.

The claws 108a, 108b of the carrier 86 perform two functions. On the one hand, the support of the carrier arm 114 for the switching element 82 is achieved. On the other hand a clearance free assembly of the travel limiting element 82 in the groove is effected. Any possible deformation of the travel limiting element 82 does not influence the switching behaviour of the switching element 85.

During operation, a distinction is to be made between the following three situations:

1. In a release position the brake pedal is not actuated and the brake is deactivated. The control valve housing 50 of the control valve 30 and the actuation member 70 are brought into the right hand end position in FIG. 1 by the reset springs 74 and 71 so that the travel limiting element 82 and the bead 106 of the control lever 102 are biassed against the wall 91a (see FIG. 2). This activates the switching element 85.

2. Upon an actuation of the brake pedal the actuation member 70 together with the control valve housing 50 travels to the left in the direction of the arrow X (FIG. 1) so that the travel limiting element 82 and the bead 106 of the control lever 102 clear the wall 91a (see FIG. 2). This deactivates the switching element 85.

For an improved safety, a check is carried out with each brake actuation in order to verify whether a signal is issued by the switching element 85 each time the bead 106 clears the wall 91a.

3. With the return of the brake pedal the actuation member 70 travels to the right relative to the control valve housing 50 until the travel limiting element 82 or the control lever 102, respectively, of the switching element 85 contact the abutment 91. This activates the switching element 85, and a signal is issued to the electronic controller of the brake booster so that it aborts a power assisted emergency braking or initiates a directed braking, respectively.

Figure 4:
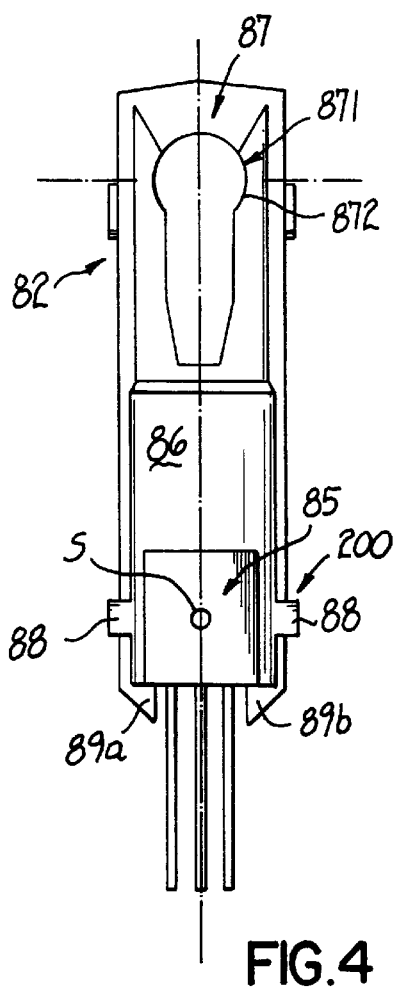
FIG. 4 shows a carrier with a switching element in a second embodiment as a schematic plan view.
Figure 5:
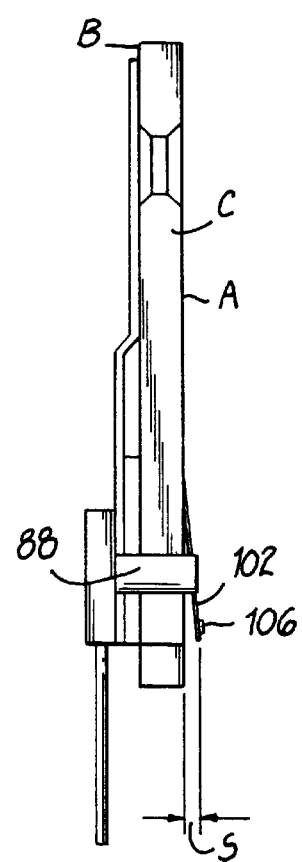
FIG. 5 shows the carrier with the switching element according to FIG. 4 in a schematic side view.
Figure 6:
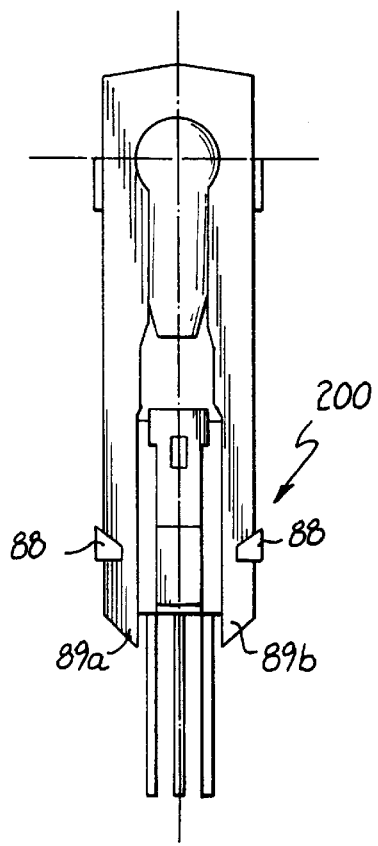
FIG. 6 is another plan view of the carrier with the switching element according to FIG. 4.

FIGS. 4 and 5 show the travel limiting element 82 with the clamped on switching element 85 in another embodiment, with FIG. 5 showing the switching element 85 in its position facing the brake pedal. The actual switch 85 is rigidly connected with the carrier sheet metal 86. From the carrier sheet metal 86 two angled retaining arms 88 are laterally projecting which encircle the two legs of the travel limiting element 82 and are closed towards the opposite side over a preferably rectangular edge of the retaining arms 88 to contact the side facing the brake pedal (see FIG. 6). A key element 162 of the switch 85 is accepted between the legs 89a, 89b of the travel limiting element 82 and projects beyond an abutment face (A) by a defined length of travel (s) (FIG. 5).

As can be seen from FIG. 5, the carrier sheet metal 86 extends from the switching element 85 to appriximately the centre of the travel limiting element 82 and is then folded to such an extent that the remaining length comes in plane contact with a surface (B).

On the upper end (FIG. 4) of the carrier sheet metal 86 a fork shaped opening 87 is provided which via a throat 871 merges into a mounting radius 872 according to the diameter of the annular groove between the collars 83, 84. The carrier sheet metal 86 can thus be axially interlocked with the actuation member 70, which at least locates the axial position of the switch.

Figure 7:
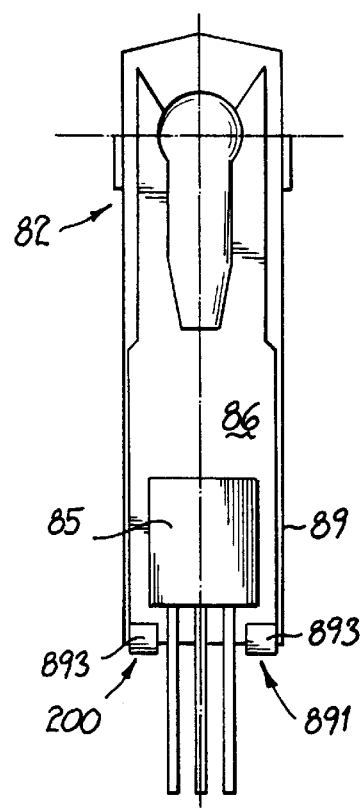
FIG. 7 shows a carrier with a switching element in a third embodiment as a schematic plan view.
Figure 8:
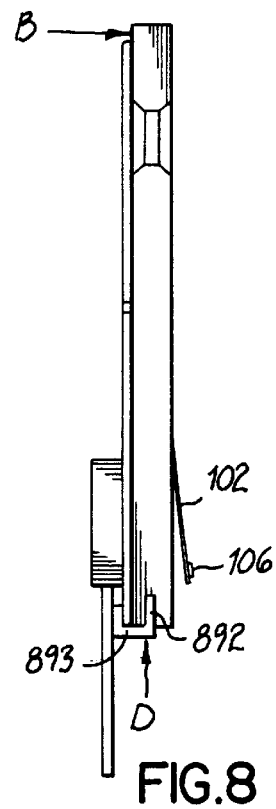
FIG. 8 is a schematic side view of the carrier with the switching element according to FIG. 7.

FIGS. 7 and 8 show another fastening modification. Here the carrier sheet metal 86 extends planely with respect to the surface (B) of the travel limiting element 82 to ends 891 of the legs. A slot shaped recess 892 in the faces of the legs of the travel limiting element 82 accepts retaining clamps 893 the cross section of which is approximately U shaped. These clamps 893 engage both the recess 892 of the legs 89a, 89b and the flush end of the carrier sheet metal 86. During assembly, the U shaped cross section is resiliently expanded by a defined extent in order to obtain a biassed contact of the clamps 893. This ensures that the clamps 893 cannot loosen under operating conditions. The reliable seat can optionally also be achieved by bonding of by material caulking of the clamps 893 with the legs of the travel limiting element 82.

An anchor 62 is urged against the travel limiting element 82 by the action of the reset spring 64 so that in the actuation directing (X) a clearance free and smooth movement of the the two components is obtained during a normal actuation via the brake pedal.

In this context, a normal actuation means that the threshold of the pedal actuation rate set to initiate an automatic braking operation is not reached. The actuation of the brake pedal is then introduced via the actuation member 72 into the brake booster which displaces the actuation member 70 relative to the control housing 50. Due to the direct contact of the anchor 62 with the travel limiting element 82 a relative movement is directly transferred so that the inner valve seat 31 being at least connected with the anchor 62 is lifted off its seat against the control valve 30 and the connection of air being unter atmospheric pressure to the chamber 10 of the brake booster 40 is enabled. The amount of the relative movement is dependent on how far the sensor disk 90 can penetrate into the reaction disk 100.

The now building up differential pressure between the chambers 10, 20 activates the brake power amplification in the usual manner which is introduced into the control housing 50 via the movable wall 41. Being a central transmission link, the task of the reaction disk 100 is to transfer the booster power and the pedal force to the reaction piston 110 which is in direct engagement with the master cylinder 120.

Upon termination of the braking operation, i.e. the return of the brake pedal, at first the pedal force component only of the total master cylinder actuation force is nulled with the booster power remaining maintained according to the last pedal position until the control valve 30 is returned opposite the actuation direction (X) due to the relative movement between the actuation member 70 and the control housing 50 until the thereby effected connection between the chamber 10 and the chamber 20 relieves the pressure differential and reduces the booster power accordingly. With this relative return stroke movement between the actuation member 70 and the control housing 50, the travel limiting element 82 or the associated switching element 85, respectively, collides with the rear abutment 91 of the duct K in the control housing which causes the control lever 102 to make contact. This switching operation takes place independent of any superposition of the electromagnetic activation with each termination of the braking operation by returning the brake pedal.

Instead of arranging the carrier 86 in the annular groove of the actuation member 70, 80 so that the carrier is limited in its axial movability or completely blocked, the carrier 86 can also be coupled with the travel limiting element 82 in a suitable manner. This can be done for example by clamping the carrier 86 to the travel limiting element 82 in such a manner that the clamps used for this purpose are integrally formed on the carrier and engage in recesses which are formed on the sides of the legs of the travel limiting element. Thus the carrier with the switching element cannot move in a radial direction with respect to the actuation member 70, 80 farther than the travel limiting element so that the defined switching operation of the switching element is not affected.

We claim:

1. A vehicle brake system with an electronically controllable brake booster, comprising
    an actuation member (70, 80) transferring the actuation travel of a brake pedal to a master cylinder,
    which is allocated a travel limiting element (82) accepted between two abutments (91, 92) which limits the actuation travel of the actuation member (70), and
    a switching element (85) which upon an actuation movement of the actuation member (70, 80) can be activated by an abutment (91a) in order to issue a signal to a controller of the brake booster, with
    the travel limiting element (82) being arranged on the actuation member (70, 80) between two collars (83, 84), and
    a carrier (86) accepting the switching element (85) being arranged between the travel limiting element (82) and one of the two collars (83, 84).

2. A vehicle brake system with an electronically controlled brake booster (40) with an additional air control which can be activated depending on the actuation dynamics of a brake pedal, and which comprises
    an actuation member (70, 80) for transmitting the actuation movement of the brake pedal to a master cylinder, which is allocated a travel limiting element (82) accepted between two abutments (91, 92) which limits the actuation movement of the actuation member (70), and a switching element (85) which can be activated by an abutment (91a) upon an actuation movement of the actuation member (70, 80) in order to issue a signal to a controller of the brake booster, whereby the travel limiting element (82) is arranged clearance-free in the direction of actuation at the actuation member (70, 80), and a carrier (86) accepting the switching element (85) is connected with the travel limiting element (82).

3. The vehicle brake system according to claim 2, characterized in that the travel limiting element (82) is arranged between two collars (83, 84) at the actuation element (70, 80), and the carrier (86) is arranged between the travel limiting element (82) and one of the two collars (83, 84).

4. A vehicle brake system with an electronically controllable brake booster, comprising an actuation member (70, 80) transferring the actuation travel of a brake pedal to a master cylinder, which is allocated a travel limiting element (82) accepted between two abutments (91, 92) which limits the actuation travel of the actuation member (70), and a switching element (85) which upon an actuation movement of the actuation member (70, 80) can be activated by an abutment (91a) in order to issue a signal to a controller of the brake booster, with the travel limiting element (82) being arranged on the actuation member (70, 80), and a carrier (86) accepting the switching element (85) being arranged at the travel limiting element (82).

5. A vehicle brake system according to claim 4, characterized in that the travel limiting element (82) at the actuation member (70, 80) is arranged between two collars (83, 84) and the carrier (86) is arranged between the travel limiting element (82) and one of the two collars (83, 84).

6. A vehicle brake system according to claim 4, characterized in that the carrier (86) comprises two claws (108a, 108b) which grip an actuation member (48) in an at least partially positive manner.

7. A vehicle brake system according to claim 4, characterized in that the carrier (86) extends parallel to the travel limiting element (82) between the two abutments (91, 92).

8. A vehicle brake system according to claim 4, characterized in that the carrier (86) comprises a carrier arm (114) on which the switching element (85) is arranged.

9. A vehicle brake system according to claim 8, characterized in that at least one of the claws (108a, 108b) and the carrier arm (114) are formed from an elastic material.

10. A vehicle brake system according to claim 8, the previous claim, characterized in that at least one of the claws (108a, 108b) and the carrier arm (114) are bent so that the travel limiting element (82) and the carrier (86) are accepted clearance free between two collars (83, 84).

11. A vehicle brake system according to claim 8, characterized in that the carrier arm (114) is in contact with the travel limiting element (82).

12. A vehicle brake system according to claim 4, characterized in that the switching element (85) protrudes between two legs (89a, 89b) of the travel limiting element (82) and is directed toward the abutment (91a).

13. A vehicle brake system according to claim 4, characterized in that the switching element (85) comprises a pivotable control lever (102), a free end (106) of which can contact the abutment (91a).

14. A vehicle brake system according to claim 13, characterized in that the abutment (91a) is formed by a housing (42) of the brake booster.

15. A vehicle brake system according to claim 13, characterized in that the control lever (102) can be brought into contact with one of the two abutments (91, 91a).

16. A vehicle brake system according to claim 4, characterized in that the switching element (85) is captively coupled with the travel limiting element (82) along the direction of the actuation movement of the actuation member (70, 80).

17. A vehicle brake system according to claim 4, characterized in that the switching element (85) is captively coupled with the travel limiting element (82) by at least one retaining member (200), with the retaining member (200) connecting the carrier (86) or the switching element (85) with the travel limiting element (82).

18. A vehicle brake system according to claim 17, characterized in that that the retaining member (200) comprises at least one bent clip (88) which grips the travel limiting element (82) in an at least partially positive manner.

19. A vehicle brake system according to claim 17, characterized in that the retaining member (200) comprises at least one clamp (893) which urges the carrier (86) or the switching element (85) against the travel limiting element (82).

20. A vehicle brake system according to claim 19, characterized in that the clamp (893) is designed as a spring clamp which resiliently clamps the carrier (86) or the switching element (85) against the travel limiting element (82).

21. A vehicle brake system according to claim 17, characterized in that at least one retaining member (200) is arranged in the area of the switching element (85).

22. A vehicle brake system according to claim 17, characterized in that the at least one retaining member (200) is arranged in the area of the end of the travel limiting element (82) remote from the actuation member (70, 80).

23. A vehicle brake system according to claim 22, characterized in that that the at least one retaining member (200) engages a recess in the travel limiting element (82).

* * * * *